June 28, 1927.
A. WELLERT
1,633,964
VEHICLE SIGNAL
Filed Dec. 27, 1926
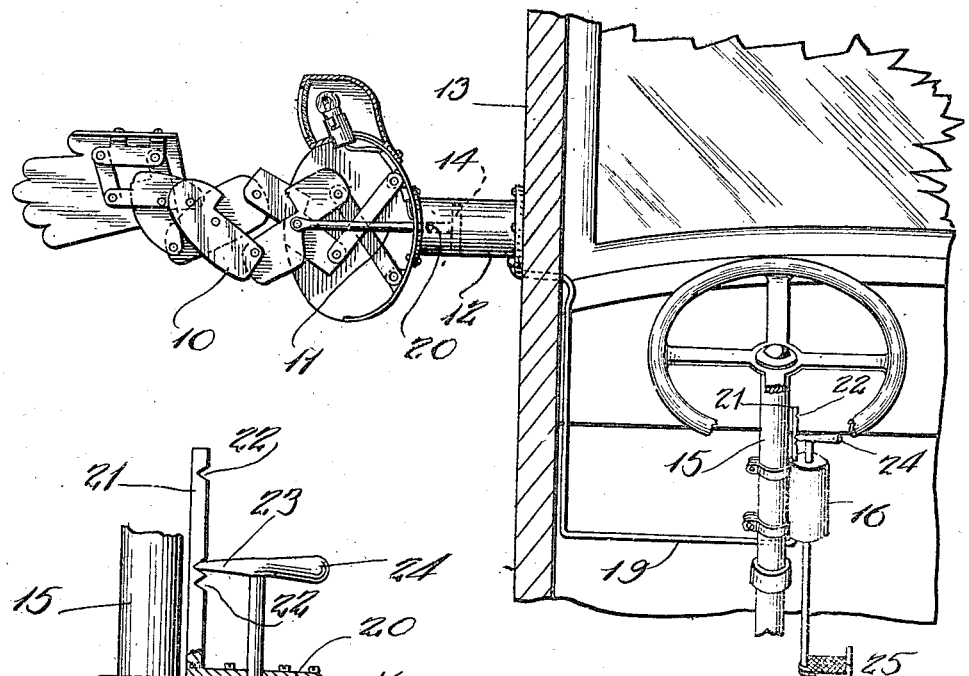
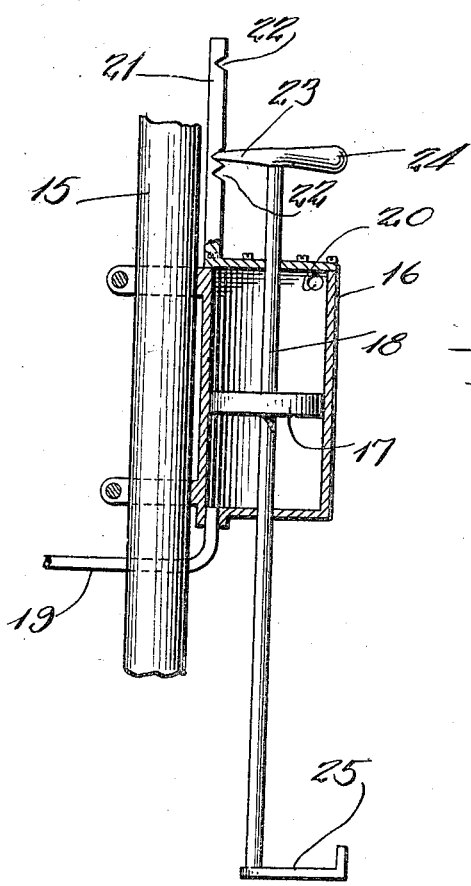
Inventor
Anton Wellert.
Attorney Patented June 28, 1927.

1,633,964

UNITED STATES PATENT OFFICE.

ANTON WELLERT, OF BINGHAMTON, NEW YORK.

VEHICLE SIGNAL.

Application filed December 27, 1926. Serial No. 157,394.

This invention relates to vehicle automobile signals and has special reference to an improvement in the operating means of the automobile signal shown in my prior Patent Number 1,597,746, dated August 31, 1926.

One important object of the present invention is to provide an improved fluid pressure operating means for a signal of the type shown in said prior patent, the means including a control place convenient to the normal position of the operator's hands and feet and capable of either manual or pedal actuation.

A second important object of the invention is to provide an improved device of this description including a hydraulic or fluid pressure cylinder having a piston rod carrying indicating and stop means associated with cooperating means adjacent said piston rod.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a view, partly in section, of the front part of an automobile showing the signaling device and its improved operating means.

Figure 2 is an enlarged detail section through the means for controlling the signal from the automobile driver's position.

In carrying out the present embodiment of the invention it will be seen that there is provided a signaling device 10 which is of the same character as that shown in the aforesaid prior application and provided with an operating rod 11 having the same function as the rod 26 of the prior patent. The signal is supported on a cylinder 12 fixed to the side 13 of the automobile and the rod 11 extends into this cylinder from the outer end and is provided within the cylinder with a piston head 14. Fixed to the steering wheel post 15, or to any other convenient support, is a second cylinder 16 wherein is a piston 17 which is mounted on a piston rod 18 projecting through both ends or the cylinder 17. The inner or base end of the cylinder 12 is connected to the lower end of the cylinder 16 by means of a pipe 19 and the remaining end of each cylinder is provided with an air vent 20 so that the escape and inflow of air is permitted at this end of each cylinder. Fixed on one head of the cylinder 16 is a bar 21 having a series of notches 22 suitably spaced therein and on the piston rod 18 is mounted a tooth 23 preferably forming one end of a handle 24. This tooth is engageable in any one of the notches 22 as may be desired and these notches are so arranged that they correspond to different positions of the signal 10. The lower end of the rod 18 projects downwardly near the foot of the operator and is provided with a pedal 25.

In the operation of the device the rod 18 is rotated to free the tooth 23 from the notch in which it may be engaged and proper up. or down movement is given the rod, either by hand or with the foot, until the tooth 23 is opposite the notch 22 corresponding to the desired position of the signal 10, whereupon the tooth is engaged in this notch. Obviously, until the tooth 23 is purposely disengaged the piston 17 will be held in the desired position. As the piston 17 moves the piston 14 will move in a corresponding manner because any movement of the piston 17 will tend to reduce or increase, in accordance with the direction of movement, the pressure in the air or other fluid between the pistons 17 and 14 and through this increase or decrease of pressure in the cylinder 12 the piston 14 will be moved.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In an automobile signaling device, a signal including a longitudinally movable operating rod, fluid pressure means controlled by the driver of the automobile and connected to said rod for operating the same, and a ratchet and pawl device actuated by the movement of said means for regulating the extent of movement of the means and for retaining it in adjusted position.

2. In an automobile signaling device, a signal including a longitudinally movable operating rod, a piston head on said operating rod, a cylinder wherein said piston is mounted for reciprocation under fluid pressure, a second cylinder arranged for convenient access by the driver of the automobile, a piston in the second cylinder, a piston rod carrying the last mentioned piston and projecting from the cylinder for actuation by the driver, a pipe connecting said cylinders whereby movement of the second piston effects like movement of the first piston and actuation of the signal, a bar having spaced notches therein fixed adjacent a projecting portion of said piston rod, and a tooth carried by said piston rod and engaging selectively in said notches.

3. In an automobile signaling device, a signal including a longitudinally movable operating rod, a piston head on said operating rod, a cylinder wherein said piston is mounted for reciprocation under fluid pressure, a second cylinder arranged for convenient access by the driver of the automobile, a piston in the second cylinder, a piston rod carrying the last mentioned piston and projecting from the cylinder for actuation by the driver, a pipe connecting said cylinders whereby movement of the second piston effects like movement of the first piston and actuation of the signal, said piston rod projecting through both ends of its cylinder, a handle on the upper end of the rod, a pedal on the lower end thereof, a bar having spaced notches therein fixed adjacent a projecting portion of said piston rod, and a tooth carried by said piston rod and engaging selectively in said notches.

In testimony whereof I affix my signature.

ANTON WELLERT.